United States Patent [19]

Mawhinney et al.

[11] Patent Number: 5,898,674
[45] Date of Patent: Apr. 27, 1999

[54] SYSTEM AND METHOD FOR PERFORMING NON-DISRUPTIVE DIAGNOSTICS THROUGH A FRAME RELAY CIRCUIT

[75] Inventors: Ted N. Mawhinney, Clearwater; Richard A. Mundwiler, Safety Harbor, both of Fla.

[73] Assignee: Paradyne Corporation, Largo, Fla.

[21] Appl. No.: 08/888,410

[22] Filed: Jul. 7, 1997

Related U.S. Application Data

[63] Continuation-in-part of application No. 08/557,873, Nov. 14, 1995, Pat. No. 5,654,966
[60] Provisional application No. 60/034,458, Dec. 31, 1996.
[51] Int. Cl.[6] .................................................. H04B 3/46
[52] U.S. Cl. ............................. 370/247; 370/251; 379/12
[58] Field of Search .................................. 370/241, 242, 370/243, 244, 245, 246, 247, 248, 249, 250, 251; 379/1, 2, 10, 12; 371/20.1, 20.2, 20.4; 340/825.06, 825.16, 825.07

[56] References Cited

U.S. PATENT DOCUMENTS

| | | | |
|---|---|---|---|
| 4,424,421 | 1/1984 | Townsend et al. | 370/251 |
| 4,980,887 | 12/1990 | Dively et al. | 371/20.2 |
| 5,210,740 | 5/1993 | Anzai et al. | 370/251 |
| 5,313,453 | 5/1994 | Uchida et al. | 370/244 |

*Primary Examiner*—Chi H. Pham
*Assistant Examiner*—Ricky Q. Ngo
*Attorney, Agent, or Firm*—Thomas, Kayden, Horstemeyer & Risley

[57] ABSTRACT

A system and method are provided for providing non-disruptive diagnostics between a first device and a second device in communication through a virtual circuit of a frame relay network. In accordance with one aspect of the invention, the method defines a diagnostic channel by assigning it a unique channel address, transmits a test command from the first device to the second device across the unique channel address, monitors the unique channel address for a response to the test command, and then evaluates the response to determine whether it reflects a fault in the virtual circuit. In accordance with one embodiment, the test command could be a pattern message, a connectivity request, a start send pattern command, a start loopback command, a start monitor pattern command, and a start send pattern command. As will be appreciated by those skilled in the art, a number of differing test commands, patterns, and sequences could be employed, consistent with the concepts and teachings of the present invention, which provides for such testing to be conducted over a dedicated logical channel and, therefore, non-disruptively of the other data and channels multiplexed in the single virtual circuit.

30 Claims, 10 Drawing Sheets

| Application | | | |
|---|---|---|---|
| Presentation | End - to - End Signaling | | |
| Session | | | |
| Transport | | | |
| Network | Q.931 | X.25 Packet | Frame Relay |
| Data Link | Q.921 (LAPD) | | |
| Physical | I.430 Basic Rate Interface and I.431 Primary Rate Interface | | |

| Transmitter Device | | | | Receiver Device | |
|---|---|---|---|---|---|
| Frame Type | Address | Message Type | Seq. # | Monitor Pattern | DTE |
| Multiplexed | 63 | Pattern Message | 1 ⟶ | Valid | |
| Transparent | None | n/a | n/a ⟶ | User | ⟶ |
| Multiplexed | 1 | n/a | n/a ⟶ | User | ⟶ |
| Multiplexed | 63 | Pattern Message | 2 ⟶ | Valid | |
| Multiplexed | 1 | n/a | n/a ⟶ | User | ⟶ |
| Transparent | None | n/a | n/a ⟶ | User | ⟶ |
| Multiplexed | 63 | Pattern Message | 3 ⟶ | Valid | |
| Multiplexed | 63 | Pattern Message | 4  Dropped | | |
| Multiplexed | 63 | Pattern Message | 5 ⟶ | Error | |

Fig. 6A

SYSTEM AND METHOD FOR PERFORMING NON-DISRUPTIVE DIAGNOSTICS THROUGH A FRAME RELAY CIRCUIT

CROSS-REFERENCE TO RELATED APPLICATIONS

This application is a continuation-in-part of U.S. patent application Ser. No. 08/557,873, filed on Nov. 14, 1995, now U.S. Pat. No. 5,654,966, and entitled Circuit and Method for Multiplexing a Frame-Relay Virtual Circuit and Frame-Relay System Having Multiplexed Virtual Circuits. This application further claims the benefit of U.S. Provisional patent application Ser. No. 60/034,458, filed on Dec. 31, 1996, and entitled Non-Disruptive End-to-End Diagnostic Through a Frame Relay.

BACKGROUND OF INVENTION

1. Field of the Invention

The present invention generally relates to frame relay networks, and more particularly to a system and method for testing end-to-end connections of a virtual circuit across a frame relay network, without disrupting other user traffic being channeled across the same virtual circuit.

2. Discussion of the Related Art

Modem communications networks often include a number of paths or links that are interconnected to route voice, video, and data (hereinafter collectively referred to as "data") traffic from one location of the network to another. At each location, an interconnect node couples a plurality of source nodes and destination nodes to the network. In some cases, the sources and destinations are incorporated in a private line network that may include a series of offices connected together by leased-lines with switching facilities and transmission equipment owned and operated by the carrier or service provider and leased to the user. This type of network is conventionally referred to as a circuit-switching network. Accordingly, a source node of one office at one location of the network may transmit data to a destination node of a second office located at another location of the network through their respective switching facilities.

At any given location, a large number of source nodes may desire to communicate through their respective switching facilities, or interconnect node, to destination nodes at various other locations of the network, the data traffic from the various source nodes is first multiplexed through the source switching facility, then demultiplexed at the destination switching facility and finally delivered to the proper destination node. A variety of techniques for efficiently multiplexing data from multiple source nodes onto a single circuit of the network are presently employed in private line networks. For instance, time division multiplexing ("TDM") affords each source node full access to the allotted bandwidth of the circuit for a small amount of time. The circuit is divided into defined time segments, with each segment corresponding to a specific source node, to provide for the transfer of data from those source nodes, when called upon, through the network.

Other data communications systems, in contrast, have not been as successful employing multiplexing techniques to enhance network efficiency further. In particular, frame-relay networks offer far fewer alternatives than their circuit-switching network counterparts. Frame-relay networks are often referred to as packet-switching networks. Packet-switching networks, as opposed to circuit-switching networks, allow multiple users to share data network facilities and bandwidth rather than providing a specific amount of dedicated bandwidth to each user, as in TDM. Instead, packet switches divide bandwidth into connectionless, virtual circuits. As is known, virtual circuit bandwidth is consumed only when data are actually transmitted. Otherwise, the bandwidth is not used. In this way, packet-switching networks essentially mirror the operation of a statistical multiplexer (whereby multiple logical users share a single network access circuit).

One problem, however, with such traditional virtual circuits relates to the throughput efficiency in frame-relay and other packet-switching networks. For instance, a one-to-one correspondence exists between applications and frame-relay virtual circuits, there being no inherent mechanism in today's frame-relay standards for transporting end-to-end data management. Internet Engineering Task Force Request for Comments ("IETF RFC") 1490 "Multiprotocol Interconnect Over Frame Relay," herein incorporated by reference, provides the ability to multiplex protocols, but forces the equation of a protocol to a single logical channel on a given virtual circuit. Additionally, IETF RFC 1490 protocol headers must appear on every single frame transmitted over the circuit, without exception.

The circuit and method of related U.S. patent application Ser. No. 08/557,873, filed on Nov. 14, 1995, and entitled Circuit and Method for Multiplexing a Frame-Relay Virtual Circuit and Frame-Relay System Having Multiplexed Virtual Circuits discloses a system and method for providing end-to-end data management over a single frame-relay virtual circuit of the network. Briefly, the circuit of the system includes: (1) a logical channel creation circuit for designating a channel flag and first and second headers to be associated with frames relayed via first and second logical channels over the single frame-relay virtual circuit, respectively and (2) a multiplexer for associating frames of first and second data streams with the first and second logical channels, respectively, by inserting the channel flag and second header into each frame of the second data stream and the first header into only frames of the first data stream for which the associated flags match the channel flag, the first and second logical channels thereby allowed to be multiplexed over the single frame-relay virtual circuit, ones of the frames of the first data stream free of the first header to reduce an overhead of the multiplexing circuit. Judicious choice of the channel flag allows the first data stream to be relatively free of additional overhead, while the second data stream bears the bulk of the additional overhead.

In a preferred embodiment of the system disclosed therein, the multiplexing circuit is adapted to operate in a virtual secondary channel mode wherein the logical channel creation circuit designates the first and second logical channels as primary and secondary channels, respectively, the first data stream subject to a more stringent performance requirement than the second data stream. In the virtual secondary channel mode, the multiplexing circuit allows the single frame-relay virtual circuit to relay the secondary channel. The primary channel may be employed, for instance, to carry user traffic, while the secondary channel may be employed, for instance, to carry management traffic.

While the system and method of this prior frame-relay management system provides an effective way to multiplex logical communication channels across a single virtual circuit, further improvements are still desired. Namely, a manner of providing non-disruptive diagnostics across a single virtual circuit.

SUMMARY OF INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a method for providing non-disruptive diagnostics between a first device and a second device in communication through a virtual circuit of a frame relay network. In accordance with one aspect of the invention, the method defines a diagnostic channel by assigning it a unique channel address, transmits a test command from the first device to the second device across the unique channel address, monitors the unique channel address for a response to the test command, and then evaluates the response to determine whether it reflects a fault in the virtual circuit. In accordance with one embodiment, the test command could be a pattern message, a connectivity request, a start send pattern command, a start loopback command, a start monitor pattern command, and a start send pattern command. As will be appreciated by those skilled in the art, a number of differing test commands, patterns, and sequences could be employed, consistent with the concepts and teachings of the present invention, which provides for such testing to be conducted over a dedicated logical channel and, therefore, non-disruptively of the other data and channels multiplexed in the single virtual circuit.

In accordance with another aspect of the present invention, a system is provided for providing non-disruptive diagnostics between a first device and a second device in communication through a virtual circuit of a frame relay network. Preferably, the virtual circuit includes a plurality of logical circuits. In one embodiment, the system includes defining means for defining one of the plurality of logical circuits as a diagnostic channel by assigning it a unique channel address, which is transmitted as part of the packet frame. The system also includes testing means for initiating a test sequence by the first device. The testing means have a transmitter means for transmitting the test sequence to the second device across the diagnostic channel. A receiver is associated with the second device for receiving and identifying the test sequence transmitted by the first device. Responding means associated with the second device for responding to the test sequence, the responding means being configured to transmit its response over the diagnostic channel, back to the first device. Finally, evaluating means are associated with the first device for identifying the response. The specific operation of the particular elements, such as the responding means and the evaluating means still necessarily vary, depending upon the particular diagnostic test being executed. For example, the operation of the elements, while executing a diagnostic pattern test, will be different than when executing a loopback test.

In the preferred embodiment of the system, the first device includes multiplexing means for multiplexing communications from a plurality of first communicating devices associated with the first device into the virtual circuit, with the communications being directed to a plurality of second communicating devices associated with the second device. The multiplexing means further includes means for defining a plurality of logical connections, and is configured to multiplex the communications from the plurality of first communicating devices by assigning each a unique channel for the virtual circuit, each channel being accessed by a unique address.

In accordance with yet another aspect of the invention, a method provides non-disruptive diagnostics for a system having a first plurality of communicating devices communicating with a second plurality of communicating devices through a virtual circuit of a frame relay network. More particularly, the first plurality of communicating devices communicates across the virtual circuit through a first frame relay access unit and the second plurality of communicating devices communicates across the virtual circuit through a second frame relay access unit. In accordance with this embodiment, the method defines a plurality of logical connections, each logical connection representing a communication path between one of the first communicating devices and one of the second communicating devices. It then multiplexes each of the logical connections onto the virtual circuit by assigning each logical connection a unique communication channel, with each communication channel representing a statistical time slot. It further dedicates a unique communication channel for diagnostic messaging and generates a test message for transmission from the first frame relay access unit to the second frame relay access unit. Finally, it receives the test message at the second frame relay access unit and responds to the test message, accordingly.

Again, the novel concept of the present invention is the dedication of a distinct logical channel, among a plurality of logical channels multiplexed into a single virtual circuit, for system diagnostics. Consistent with this novel concept, various diagnostic tests may be conducted. The tests may be initiated by frame relay access units, or multiplexing nodes, or may alternatively be initiated in response to a DTE request. The tests may include pattern tests, which send out a known data pattern in a known sequence, or may include loopback or connectivity tests. Accordingly, a device that initiates a test sequence may, after transmitting a test command or message, monitor the diagnostic channel to observe and evaluate the responsive signal. In this regard, the initiating device may have to evaluate the observed signal to determine whether a line fault exists. Alternatively, for example in some pattern tests, the device receiving the transmitted test command or message may evaluate the signal to determine whether there is a line fault and merely transmit a result to the initiating device. In such an embodiment, the initiating device need merely observe the diagnostic channel to receive the result (i.e., a command indicating the status of the virtual circuit).

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIGS. 6A–6C are diagrams illustrating example diagnostic transmissions in accordance with the preferred embodiment of the present invention;

Figures 1A, 1B:
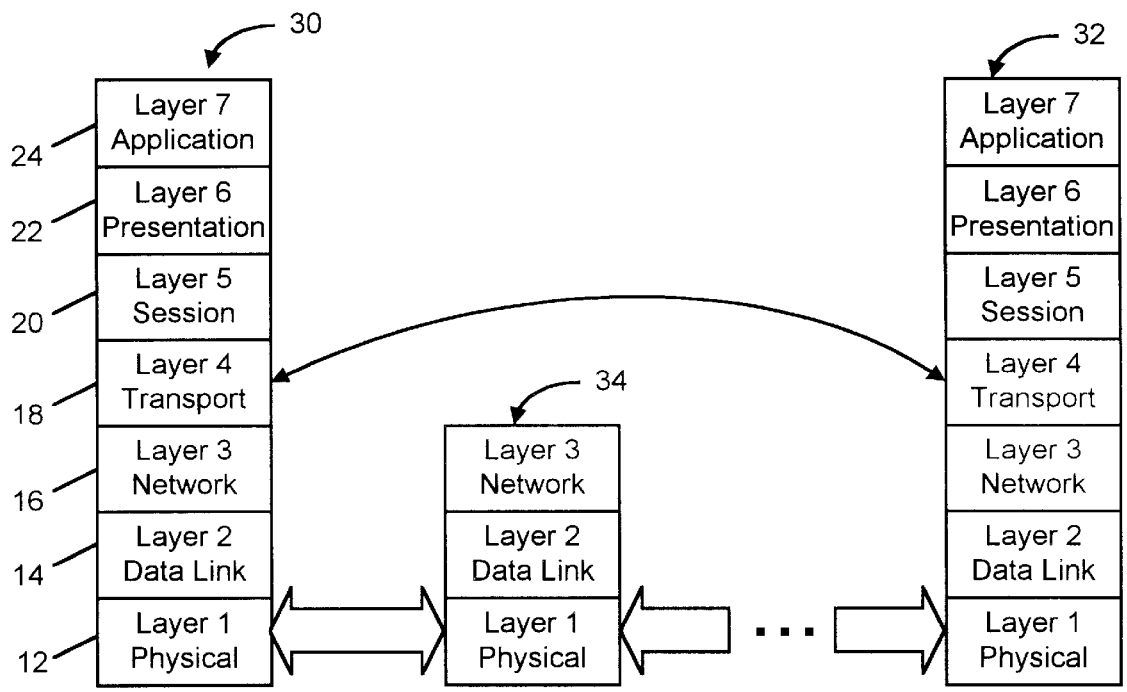
FIGS. 1A and 1B are diagrams illustrating the seven-layer OSI model, and the implementation of frame relay technology in relation to this model.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

DETAILED DESCRIPTION OF THE PREFERRED EMBODIMENT

Having summarized the present invention above, it will be appreciated that the concepts in teachings of the present invention may be applied to various alternative embodiments. However, the preferred embodiment of the invention relates to frame relay communications, and, accordingly, the description provided herein will focus on frame relay communications. But first, a more general overview is presented, which illustrates the relationship between frame relay communications and the seven-layer OSI model.

In this regard, FIGS. 1A and 1B are diagrams that illustrate frame relay communications in accordance with the seven layer OSI model. As is now well known, layer one 12 is the physical layer, which is concerned with the transmission of unstructured bit streams over a physical link. The physical layer 12 involves parameters such as signal voltage swing and bit length or duration. It further deals with the mechanical, electrical, and procedural characteristics necessary to establish, maintain, and deactivate a physical link. Layer two 14 is the data link layer, which is responsible for providing the dependable communication of data across the physical link. In this regard, it transmits blocks of data with the necessary synchronization, error control, and flow control. Layer three 16 is the network layer. The network layer 16 is responsible for establishing, maintaining, and terminating connections, and it insulates the upper layers from the details or burden of data transmission. Layer four 18 is the transport layer, which serves to provide dependable transfer of data between end points. Error recovery and flow control are also provided within layer four 18. Layer five 20 is the session layer. The session layer operates to establish, maintain, and terminate connections, or sessions, between applications running at the end points and intercommunicating with one another. In this regard, it provides the control structure for communicating between the end point applications. Layer six 22 is the presentation layer, which operates to perform data transformation in order to provide a standardized application interface, and to provide common communication services. Finally, layer seven 24 is the application layer which provides services to the users of the OSI-compliant system. Network management transaction servers and file transfer protocols are examples of application layer services.

While FIGS. 1A and 1B illustrate the entire seven layer model, the present invention is concerned with communications that primarily take place at the network layer 16. FIG. 1A illustrates the connection and communication between two end points 30 and 32 through one or more intermediate device 34. In this regard, it is appreciated that the applications executing on the end points 30 and 32 are compliant with the seven layer OSI model. As is well known, intermediate devices (such as intermediate nodes within the frame relay network) need not employ all seven layers. Instead, they may employ on the physical layer 12 (such as repeaters), only the physical 12 and data link 14 layers (such as host devices), or the physical 12, data link 14, and network 16 layers (such as gateways and routers). In this regard, the first three layers are often referred to collectively as the physical layers. The transport layer of layer four 18, as previously mentioned, is responsible for end to end communications. An example of a layer four communications protocol is Transport Control Protocol (TCP). In accordance with TCP, a device 30 may specify a communication to be directed to end point device 32. Intermediate devices 34 are responsible for ensuring that the communication packet is received by device 32.

Referring to FIG. 1B, a diagram illustrates various ITU-T specifications or recommendations, in relation to the layers of the OSI model. Specifically, the I.430 basic interface and the I.431 primary interface recommendations specify physical layer transfer-transactions. ITU-T specification Q.921 (LAPD) is provided for communications at the data link layer. ITU-T specification Q.931 governs network layer transactions for ISDN D channel control signaling in circuit mode connections For packet-switched circuits, X.25 protocol standard is provided for governing D channel signaling. Frame relay control and signaling is also provided at the network layer 16.

While frame relay technology is concerned with packet routing and delivery, it realizes improved performance over X.25. Although X.25 provides better link-by-link flow and error control, frame relay provides a much streamlined communications process. Specifically, as is known, the protocol functionality required at the user-network interface is reduced. In this regard, call-control signaling is carried on a separate logical connection from user data, and therefore intermediate nodes need not maintain state tables or process messages relating to call control on an individual per-connection basis. In addition, there is no hop-by-hop flow control and error control. Instead, end-to-end flow control and error control are the responsibility of a higher layer, if employed at all.

Figure 2A:
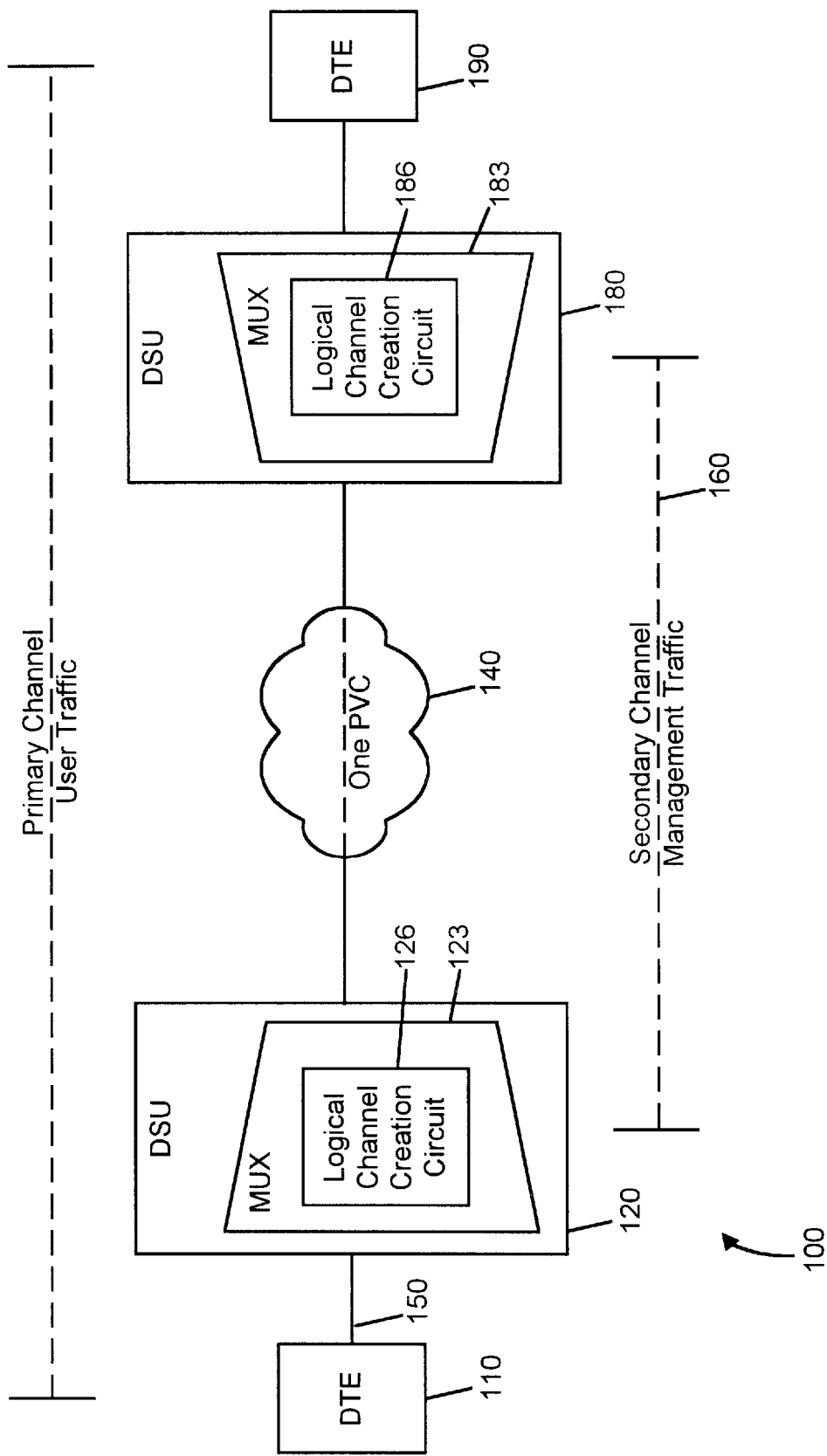
FIG. 2A is a system diagram illustrating a frame relay or packet switching network illustrating the multiplexing of user and management channels.

Referring now to FIG. 2A, a system diagram illustrates a frame-relay or packet-switching network 100 that multiplexes two or more logical connections over a single permanent virtual circuit. The network 100 includes a first data terminal equipment (DTE) 110 coupled to a first data service unit (DSU) 120 communicating across a single frame-relay virtual circuit 140 with a second DSU 180 coupled to a second DTE 190. While the network 100 is illustrated with only a pair of DSUs 120, 180, the network 100 may be a part of a much larger telecommunications network. Also, while the first and second DSUs 120, 180 are illustrated servicing the first and second DTEs, 110, 190, respectively, the first and second DSUs 120, 180 are equipped to service multiple DTEs. The single frame-relay virtual circuit 140 includes a primary channel 150 and a plurality of secondary channels 160. The present invention provides a multiplexing circuit and method for providing end-to-end data management of the primary and secondary channels 150, 160, respectively, over the single frame-relay virtual circuit 140.

In the illustrated embodiment, the first and second DSUs 120, 180 contain first and second multiplexing circuits 123, 183, respectively. The multiplexing circuits 123, 183 include logical channel creation circuits 126, 186, respectively, for designating a channel flag and first and second headers to be associated with frames relayed via the primary and secondary channels 150, 160. This mode of operation is referred to as a virtual secondary channel mode due to the fact that the logical channel creation circuits 126, 186 designate the logical channels (i.e. first and second logical channels) as primary and secondary channels 150, 160, respectively.

The multiplexing circuits 123, 183 also include multiplexers for associating frames of first and second data streams with the primary and secondary channels, 150, 160, is respectively. In the illustrated embodiment, the first and second data streams emanate from the first and second DTEs 110, 190, respectively. The present invention, however, is preferably transparent to the DTEs 110, 190. The multiplexing circuits 123, 183 insert the second header into each frame of the second data stream associated with the secondary channel 160 and the first header into only frames of the first data stream associated with the primary channel 150 for which the associated flags match the channel flag, the primary and secondary channels 150, 160 are multiplexed over the single frame-relay virtual circuit 140 with ones of the frames of the first data stream free of the first header to reduce an overhead of the multiplexing circuits 120, 180. As a result of a judicious choice of the channel flag, the first data stream is relatively free of additional overhead, while the second data stream bears the bulk of the additional overhead.

"Overhead," for purposes of this disclosure, is defined as additional first virtual channel overhead incurred by virtue of bits added to multiplex according to the illustrated embodiment. The major factors that influence overhead are: (1) the selected channel flag value and (2) the nature of use of the first octet in the data streams of a frame. Communication protocols commonly place protocol headers in the first several octets of a frame, with the first octet often containing a predictable value. IETF RFC 1490, for example, specifies the first octet of every frame as the control field that may only contain one of three possible values: 0x03, 0xaf or 0xbf. With any flag value outside of these three possibilities, zero overhead is guaranteed.

In most cases, given a well-selected channel flag value, the overhead imposed by this method is expected to be at or near zero. The first encapsulation method uses a Network Level Protocol Identification ("NLPID") of 0xcc, indicating an implementation of an Internet Protocol ("IP"), for a header size of two octets. it is assumed that one additional octet is required for equivalent discrimination capabilities for a total overhead of three octets. The second method uses an NLPID of 0x80, indicating an implementation of a Subnetwork Access Protocol ("SNAP"), for a header size of eight octets.

The multiplexing circuit and method of the present invention substantially decrease the overhead associated with the primary channel 150 of the single frame-relay virtual circuit 140.

Furthermore, in this mode of operation, the first data stream, associated with the primary channel 150, is subject to a more stringent performance requirement than the second data stream, associated with the secondary channel 160. The multiplexing circuits 123, 183, also allow the single frame-relay virtual circuit 140 to relay the secondary channel 160. Finally, the primary channel 150 may be employed, for instance, to carry user traffic, while the secondary channel 160 may be employed, for instance, to carry management traffic.

Figure 2B:
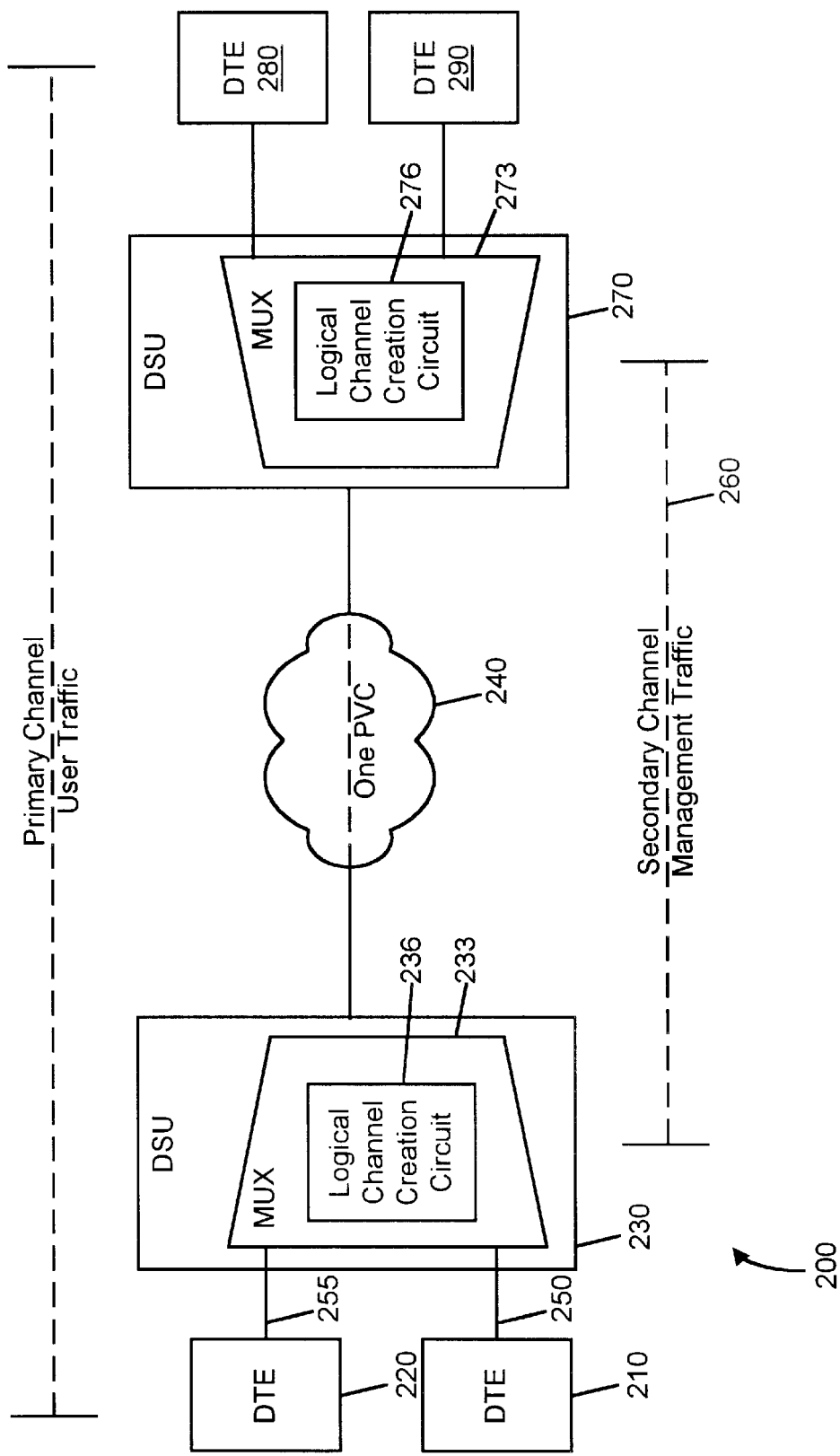
FIG. 2B is a system diagram similar to FIG. 2A, but illustrating additional primary user channels.

Turning now to FIG. 2B, a system diagram illustrates an alternative embodiment of a frame-relay or packet-switching network 200. The network 200 comprises first and second DTEs 210, 220 coupled to a first DSU 230 communicating across a single frame-relay virtual circuit 240 with a second DSU 270 coupled to third and fourth DTEs 280, 290. Again, while the network 200 is illustrated with only a pair of DSUs 230, 270, the network 200 may be a part of a larger telecommunications network capable of employing the frame-relay virtual circuit 240 of the network 200. Also, while the first and second DSUs 230, 270 are illustrated servicing the first, second and third, fourth DTEs, 210, 220, 280, 290, respectively, the first and second DSUs 230, 270 are equipped to service multiple DTES. The single frame-relay virtual circuit 240 comprises a native primary channel 250, a plurality of primary channels 255 and a plurality of secondary channels 260. The present invention provides a multiplexing circuit and method for providing end-to-end data management of the native primary, primary and secondary channels 250, 255, 260, respectively, over the single frame-relay virtual circuit 240.

In the illustrated embodiment, the first and second DSUs 230, 270 contain first and second multiplexing circuits 233, 273, respectively. The multiplexing circuits 233, 273 include logical channel creation circuits 236, 276, respectively, for designating a first and second channel flags and first, second and third headers to be associated with frames relayed via the native primary, primary and secondary channels 250, 255, 260 over the single frame-relay virtual circuit 240. This mode of operation is referred to as a virtual circuit multiplexing mode due to the fact that the logical channel creation circuits 236, 276 designate the logical channels (i.e. first, second and third logical channels) as native primary, primary and secondary channels 250, 255, 260, respectively.

The multiplexing circuits 233, 273 also include multiplexers for associating frames of first, second and third data streams with the native primary, primary and secondary channels, 250, 255, 260, respectively. In this illustrated embodiment, the first, second and third data streams emanate from the first, second, third and fourth DTEs 210, 220, 280, 290. The present invention, however, is preferably transparent to the DTEs 210, 220, 280, 290. The multiplexing circuits 236, 276 insert the second header into each frame of the second data stream associated with the primary channel 255, the third header into each frame of the third data stream associated with the secondary channel 260 and the first header into only frames of the first data stream associated with the native primary channel 250 for which the associated flags match the first channel flag. The native primary and primary channels 250, 255 are multiplexed over the single frame-relay virtual circuit 240 with ones of the frames of the first data stream free of the first header to reduce an overhead of the multiplexing circuits 230, 270. As a result of a judicious choice of the first channel flag, the first data stream is relatively free of additional overhead, while the second and third data streams bear the bulk of the additional overhead. Analogous to the virtual secondary channel mode described with respect to FIG. 2A, the multiplexing circuit and method of the present invention substantially decrease the overhead associated with the native primary channel 250 of the single frame-relay virtual circuit 240.

In the virtual circuit multiplexing mode, the first data stream, associated with the native primary channel 250, is subject to a more stringent performance requirement than the second data stream, associated with the primary channel 255. Additionally, the multiplexing circuits 239, 279 allow the single frame-relay virtual circuit 240 to act as multiple frame-relay circuits. The native primary and primary channels 250, 255 may be employed, for example each to carry user traffic, while the secondary channel 260 may be employed, for instance, to carry management traffic. This mode of operation, therefore, provides the ability to multiplex two or more primary channels on a given frame-relay circuit, along with one or more secondary channels.

Figure 3:
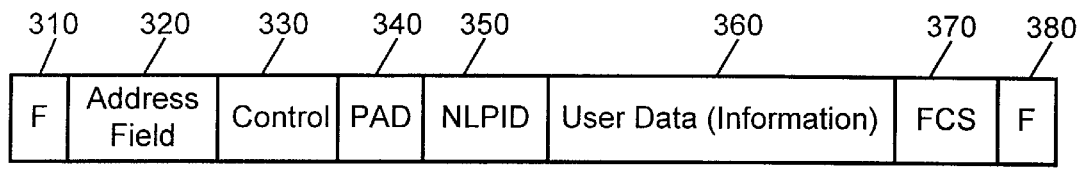
FIG. 3 is a diagram illustrating a data frame suitable for transmission over the packet-switching network of FIGS. 2A or 2B.

Turning now to FIG. 3, illustrated is a data frame 300 suitable for transmission over the packet-switching networks 100, 200 of FIGS. 2A or 2B, respectively. While the illustrated data frame 300 is formatted in a Q.922 frame, other frame formats compatible with a frame-relay network are well within the scope of the present invention. The data frame 300 comprises a first flag field 310, an address field 320, a control field 330, a pad field 340, a NLPID field 350, a user information field 360, a frame check sequence ("FCS") field 370 and second flag field 380.

The first and second flag fields 310, 380 signify the beginning and the end of the data frame 300. The address field 320 provides the destination in a frame-relay network (e.g. the first DTE 110 coupled to the first DSU 120 in FIG. 2A) for the data frame 300 to travel across a single frame-relay virtual circuit. The control field 330 identifies control information for the Q.922 format. The value of the control field 330 is typically 0x03 for a Q.922 frame unless negotiated otherwise. The pad field 340 is used to align the remainder of the frame to a two octet boundary. There may be zero or one pad octet within the pad field 340 and, if present, must have a value of zero. The NLPID field 350 is administered by the International Standards Organization ("ISO") and the Consultative Committee International Telegraph & Telephone (now the International Telecommunication Union—ITU). It contains values for many different protocols including, for instance, the Internet Protocol ("IP") and the Institute of Electrical and Electronics Engineers Subnetwork Access Protocol ("IEEE SNAP"). The NLPID field 350 relates to the receiver the protocol that is being used by the data frame 300.

A data portion of the user information field 360 carries the substantive data (i.e. the first, second or third data streams) between destinations in the frame-relay network. Additionally, a first and second octet of the user information field 360 carries the first or second channel flags and the first, second or third headers, when necessary, generated by the logical channel creation circuit of the present invention. Finally, the FCS field 370 assures the data integrity of the data frame 300.

There is no single implemented frame size for the data frame 300 in a frame-relay network. Generally, the maximum will be greater than or equal to 1600 octets, but each frame-relay provider will specify an appropriate value for its network. A DTE in a frame-relay network, therefore, must allow the maximum acceptable frame size to be configurable. Conversely, the minimum frame size allowed for the data frame 300 in a frame-relay network is five octets between the first and second flag fields 310, 380 assuming a two octet address field 320. This minimum increases to six octets for a three octet address field 320 and seven octets for a four octet address field 320.

Figure 4:
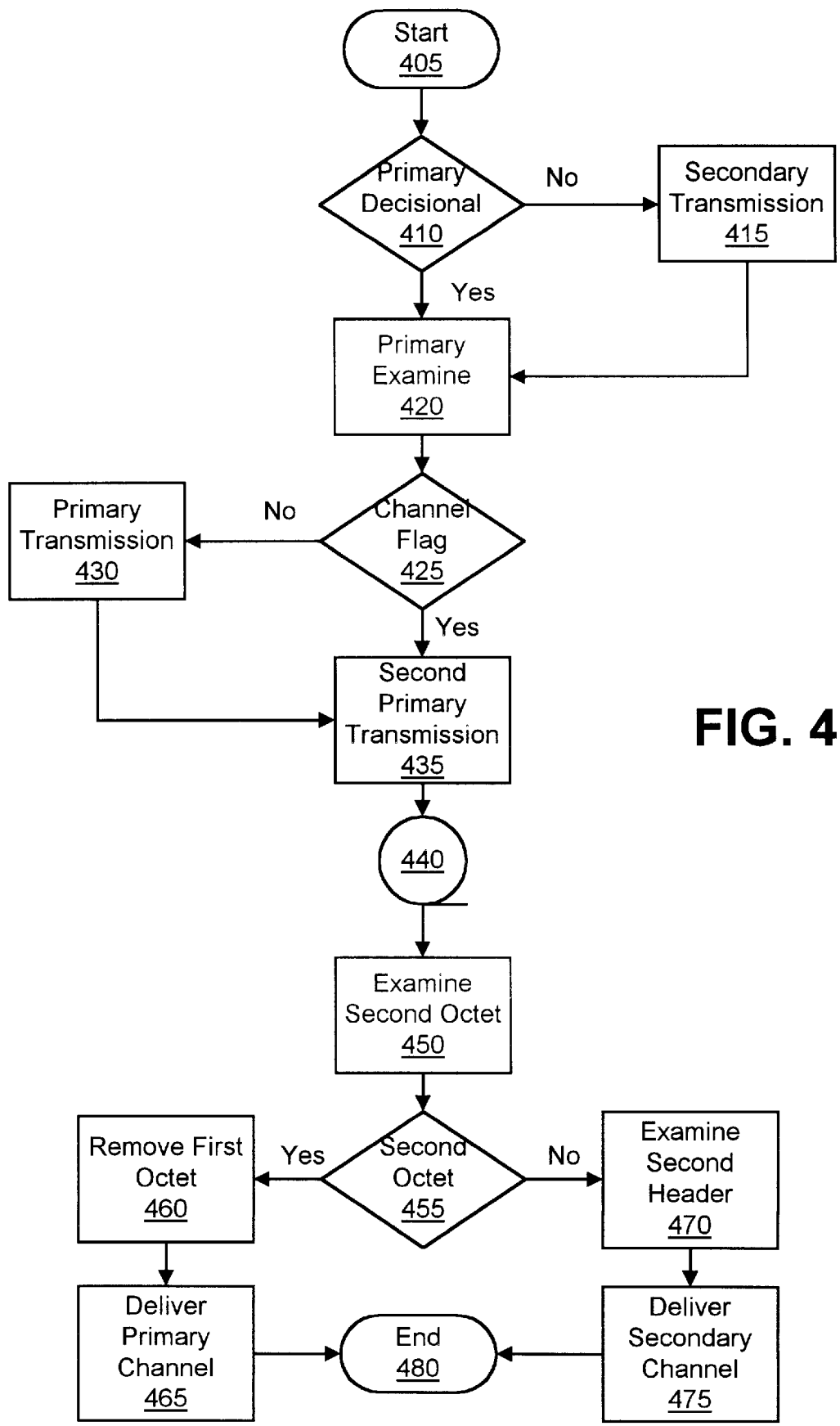
FIG. 4 is a software flowchart illustrating the method of multiplexing the user and management channels of FIGS. 2A and 2B.

Turning now to FIG. 4, illustrated is a flow diagram of a method of the present invention according to the embodiment of FIG. 2A. Again, FIG. 2A illustrates the virtual secondary channel mode whereby the logical channel creation circuits 126, 186 designate the logical channels as primary and secondary channels 150, 160, respectively.

With continuing reference to FIGS. 2A and 3, the virtual secondary channel mode of operation will now be explained in greater detail.

The virtual secondary channel mode of operation commences at a start step 405. In a primary decisional step 410, it is determined if the user information 360 emanates from the primary or secondary channel 150, 160. If the data frame 300 is a secondary frame, then the method proceeds to a secondary transmission step 415, otherwise the method proceeds to a primary examine step 420. At the secondary transmission step 415, both the channel flag and the second header are appended to the second data stream in the user information field 360 and the data frame 300 is transmitted on the secondary channel 160 from the first DSU 120 to the second DSU 180 across the single frame-relay virtual circuit 140.

At the primary examine step 420, the first octet in the user information field 360 of every primary frame is examined prior to transmission. At a first channel flag decisional step 425, it is determined if the first octet is equal to the channel flag, generated by the logical channel creation circuit of the present invention. If the first octet is not equal to the channel flag, the primary frame is transmitted over the primary channel 150 without modification in a primary transmission step 430. If the first header is equal to the channel flag, one additional octet containing the channel flag is appended to the user information field 360 of the data frame 300 prior to transmitting the primary frame over the primary channel 150 in a second primary transmission step 435. A connector 440 illustrates a transition between the transmission and reception side of the frame-relay network 100.

Upon frame receipt, the first octet of the data frame 300 is equal to the channel flag and the second octet is thereafter examined in an examine second octet step 450. At a second octet decisional step 455, it is determined if the second octet is equal to the channel flag. If the second octet is equal to the channel flag, the first octet is removed, at a remove first octet step 460. Then, the data frame 300 is delivered on the primary channel 150, at a deliver on primary channel step 465 and the method ends at an end step 480. If the second octet is not equal to flag, the second header is examined, at an examine second header step 470. Then, the data frame 300 is delivered at the secondary channel 160, at a deliver secondary channel step 475 and the method ends at the end step 480.

The virtual circuit multiplexing mode, demonstrated with respect to FIG. 2B, functions in a manner similar to the virtual secondary channel mode. The virtual circuit multiplexing mode extends the use of the channel flag/header to one or more multiplexed primary channel frames. The channel flag is used to discriminate native primary channel frames. The headers are used to discriminate among multiplexed primary channels and secondary channels.

Utilizing the system and method described above, the present invention is directed to a novel method and system for performing diagnostics. Specifically, the present invention dedicates or reserves one of a plurality of logical channels that are multiplexed upon a single virtual circuit. This reserved channel is used exclusively for diagnostics, and in this way operates non-disruptively with the rest of the user traffic across the virtual circuit. It will be appreciated that, in accordance with the multiplexing system and method described above, since dedicated time slots are not reserved for the various logical channels, the channels are said to be "statistically" multiplexed on a single virtual circuit. Therefore, at times when diagnostic commands and messages are not being exchanged across the virtual circuit, more bandwidth is available for other user or data traffic.

Figure 5:
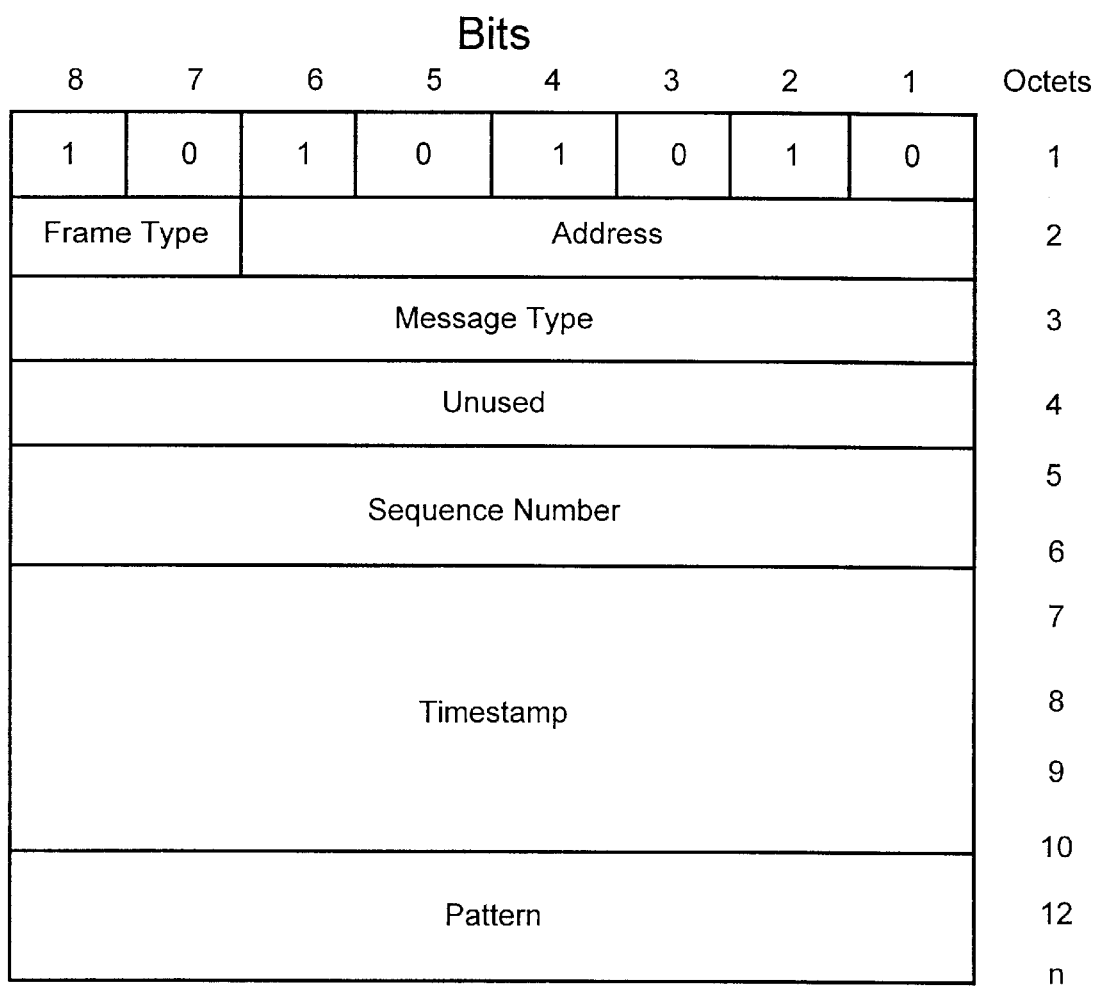
FIG. 5 is a diagram illustrating a frame format for transmission over a diagnostic channel defined in accordance with the preferred embodiment of the present invention.

Referring now to FIG. 5, a preferred frame format for messages transmitted across the diagnostic channel is shown. As illustrated, the preferred frame format is of variable octet length, depending in part upon the type of test being executed. For example, whether the test is a connectivity test, a loopback test, or a pattern test, and further whether pattern or other information is being transmitted as a part of the message. The first two octets define the multiplexing header. The frame type, of octet 2, specifies that the present packet is a multiplexed packet. The address, of octet 2, specifies the address that uniquely identifies the reserved or dedicated diagnostic channel. A diagnostic header immediately follows the multiplexing header of octets 1 and 2, and comprises octets 3–10 (preferably). Elements included within the diagnostic header include the message type, sequence number, and timestamp. The message type is used to indicate the type and disposition of the present frame. For example, whether the test is a pattern test, a connectivity test, a loopback test, etc.

In accordance with the preferred embodiment of the present invention, various message types and their definitions are identified in Table 1 immediately below.

TABLE 1

| Message Type | Definition |
| --- | --- |
| Pattern Message | Identifies a frame generated by a Send Pattern function |
| Connectivity Request | Identifies a frame generated by a Connectivity Test indicator |
| Connectivity Response | Identifies a frame generated in response to a Connectivity Request |
| Start Send Pattern Command | Commands a far-end access unit to initiate a Send Pattern function |
| Start Loopback Command | Commands a far-end access unit to initiate a Loopback function |
| Start Monitor Pattern Command | Commands a far-end access unit to initiate a Monitor Pattern function |
| Stop Send Pattern Command | Commands a far-end access unit to terminate a Send Pattern function |
| Stop Loopback Command | Commands a far-end access unit to terminate a Loopback function |
| Stop Monitor Pattern Command | Commands a far-end access unit to terminate a Send Pattern function |

Of course, a number will be inserted in the message type field, of octet 3, that corresponds to the various message types listed in the table. In addition, other diagnostic tests, messages, or commands may be provided. As will be appreciated by those skilled in the art, pattern tests transmit a continuous stream of frames having known data values. A device on the receiving end will be instructed as to the pattern type and sequence, and thus will know the particular pattern and sequence of data that it expects to receive. It can then monitor the pattern data and sequence received over the diagnostic channel to verify whether that channel is, in fact, properly transmitting data. The accurate reception of data will indicate to the receiving unit that the transmission line defined by the virtual circuit is in good and proper working order. Faulty data will be an indication that there is some type of error or system fault along or within the virtual circuit. In accordance with the connectivity test, a handshake sequence is performed on the diagnostic channel to determine the state of the virtual circuit, as well as the state of the distant access unit. Typically, a connectivity test is initiated by a user interface, command. A loopback test is typically run in conjunction with a send pattern and/monitor pattern command. When loopback is active on a virtual circuit, all frames received on the diagnostic channel of that circuit are transmitted back to the originating device. The originating device, then, after transmitting a pattern, will monitor the diagnostic channel to evaluate whether the transmitted packet is in fact received. By monitoring the integrity of the received, loopbacked results, the transmitting device can evaluate the condition of the virtual circuit.

In keeping within the description of FIG. 5, a sequence number will typically be utilized for tests in which sequence checking is required. Finally, a time stamp may be used for certain tests, when, for example, calculating the round trip transmission time. The final portion of the frame format illustrated in FIG. 5 is designated as "Pattern". This portion of the frame is utilized in connection with pattern testing in the manner described above, and as will be further described below. It will be appreciated that the present invention is directed to the broader feature of the designation or reservation of a multiplexed logical channel for purposes of providing non-disruptive diagnostics. The actual performance and evaluation of the various diagnostic tests are presented herein for purposes of illustration.

As is known in frame relay technology, some errors will invariably be encountered occasionally across any virtual circuit. These errors result from a variety of reasons. Traffic congestion often leads to errors. For example, during a transient time of peek usage, an intermediate node within the frame relay network may become congested with data traffic from various sources. If so much data is received as to fill up the intermediate node's buffer space, the node often, by design, drops packets. Therefore, even during normal operation, and with no physical fault in the data path, a virtual circuit may lose packets. Utilizing the sequence number, a transmitting device may look for acknowledgments of the various packets transmitted. If a return/acknowledgment is received out of sequence, the transmitting device will know that intermediate packets were dropped. In this regard, the permanent virtual circuit of a frame relay differs from other packet transmitting technologies, such as IP routers. In this regard, in a virtual circuit, the same intermediate route is utilized for all data packets transmitted. In contrast, IP routers route data packets based on a number of factors, and, as a result, packets transmitted from a transmitting node to a receiving node through a number of intermediate nodes may not all be transmitted along the same route or succession of intermediate nodes.

Figure 6B:
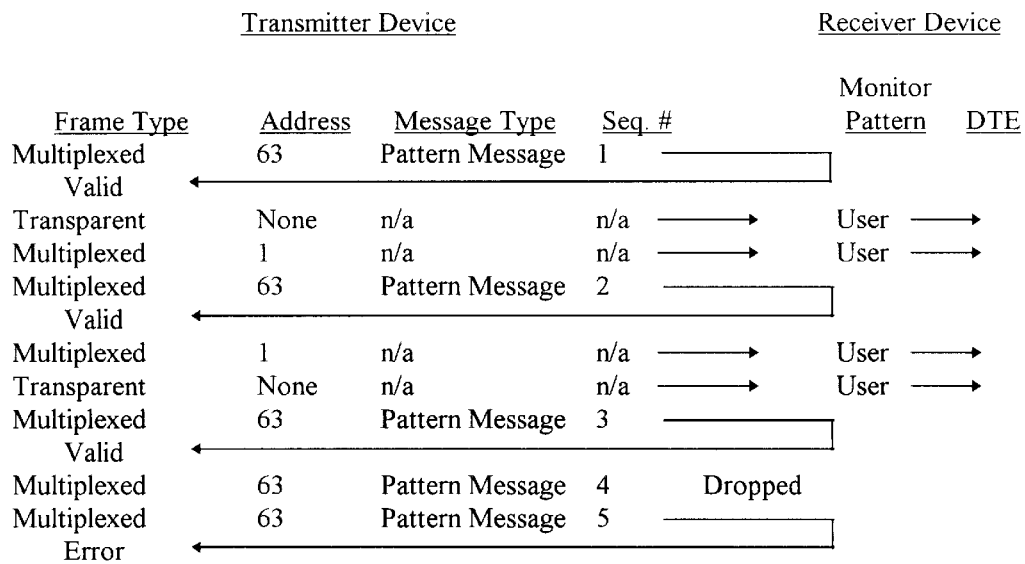
Figure 6C:
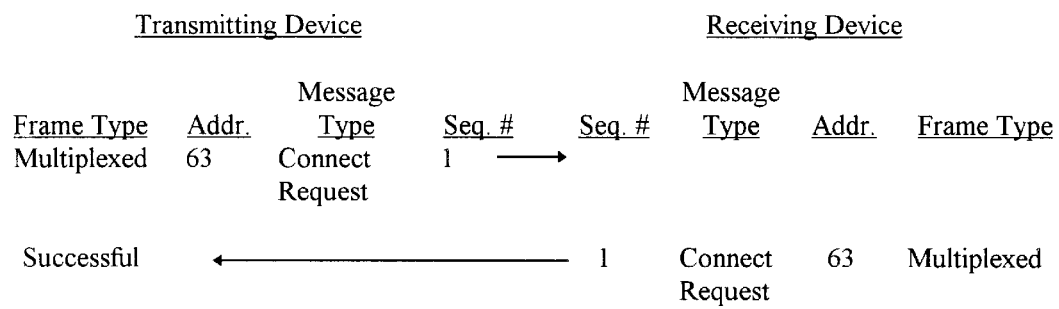

In keeping with the discussion of various diagnostic tests which may be utilized in connection with the present invention, reference is now made to FIGS. 6A, 6B, and 6C. In this regard, FIG. 6A is directed to a sequence executed in connection with a monitor pattern function. The monitor pattern function is typically executed in conjunction with a send pattern function, and is used to evaluate the sequence, data content, and delivery rate of the received packets. The rate of packet receipt is expected to equal the implementation-specific rate of packet generation used for the send pattern. Accordingly, each frame received on the diagnostic channel is evaluated for conformity to the previously specified frame format. The message type is expected to contain a type of pattern message. The sequence number is expected to contain a value of one for the first frame, and then is sequentially incremented monotomically thereafter, for each subsequent frame. The pattern element is expected to contain the pattern created by the send pattern test. In performing a monitor pattern diagnostics, the monitor pattern function is said to be in synchronization if a predetermined (e.g., implementation-specific) number of packets are received with a valid message type, the expected sequence number, and a validated diagnostic pattern or payload. All of this should occur within a interval of time that is consistent with the implementation-specific rate of packet generation. If any one or more of the foregoing criteria are not met, the monitor pattern function may be deemed to be out of synchronization, thereby indicating a failed condition or fault on the communication link or deterioration of service.

The diagram in FIG. 6A illustrates traffic, not just along the diagnostic channel, but across the virtual circuit in general. In this regard, the second column of FIG. 6A, entitled Address, lists address values of the various data frames. Those entries having an address of 63 (for purposes of illustration) are deemed to be packets transmitted along the diagnostic channel. The corresponding message types for each of these packet transmissions is Pattern Message, and the fourth column, entitled Sequence, provides the sequence number associated with the packets. Immediately to the right of the sequence column, is a column of horizontally directed arrows, which illustrate the transmission of the data across the virtual circuit. The first four columns of the diagram are associated with the transmitting device, while the fifth column (to the right of the arrows) is associated with receiving device. As will be appreciated, the transmitted pattern represents the data packets transmitted from a transmitting device, while the received pattern reflects actions that occur at the receiving device. For example, before the transmissions which are illustrated in FIG. 6A occur, each device (both the transmitting and receiving device) would be commanded into their respective modes of operation. In accordance with the message types and definitions provided in Table 1 above, the receiving device could transmit a command, (across the diagnostic channel) to the transmitting device to start a send pattern command. Alternatively, the transmitting device could transmit a command to the receiving device to start the monitor pattern command. Either of the above-described commands would cause the two end devices to enter the modes for the pattern test operation illustrated in FIG. 6A.

In keeping with the discussion of FIG. 6A, both devices will be synchronized or instructed as to the particular pattern that is transmitted. As is illustrated by the arrows between columns 4 and 5, packet sequence numbers 1, 2, and 3 are all successfully transmitted across the virtual circuit, and therefore the receiving unit indicates valid patterns for each. However, for any of a number of reasons, the packet of sequence number 4 is dropped along the virtual circuit. Since frame relay does not provide individual packet acknowledgments (as does X.25 protocol) the transmitting unit is not aware that the packet is dropped. Likewise, the receiving unit is not aware that the packet is dropped until it receives the packet for sequence number 5. At that time, the receiving unit knowing that the previously received packet was sequence number 3, detects a sequence error. Upon detecting this error, appropriate corrective action may be taken. This further corrective action will not be described in detail herein, as it is outside the scope of the present invention. Suffice it to say that the action could comprise sending a message back to the transmitting device to instruct it that an error has occurred, transmitting a message back to the transmitting unit requesting further diagnostics be performed, alerting a system operator that an error was encountered, which system operator may then advise a service provider of the error, or any of a number of other corrective actions may be taken.

FIG. 6B illustrates testing conducted in accordance with a loopback test. Loopback tests are typically run in conjunction with a send pattern and/monitor pattern test. When loopback is active on a virtual circuit, all frames received at the diagnostic channel of that circuit are transmitted back to their originating device. Thus, for example, if a device decides to initiate a diagnostic sequence, it may instruct a far end node to enter into loopback testing, so that the transmitting device may evaluate its own transmission results. Accordingly, in loopback type testing, the receiving node need not be aware of the particular patterns that are transmitted by the transmitting device, since it need not make an independent determination or evaluation of the packets received.

The diagram of FIG. 6B, like that of FIG. 6A, specifies an address of 63 to correspond to the diagnostic channel. The message type for the various diagnostic messages is "Pattern Message". The arrows directed from left to right indicate transmissions from a transmitting device to a receiving device. From the right hand side of the diagram, arrows directed first downwardly, then to the left illustrate the loopback of the transmitted message from the receiving device to the transmitting device. The diagram of FIG. 6B illustrates the same transmission sequences (1, 2, 3, 4, and 5, with 4 being dropped), as were illustrated in FIG. 6A. As in the diagnostic illustration of FIG. 6A, the diagnostic sequence of FIG. 6B does not detect a sequence error until the loopback of pattern message 5 is received by the transmitting device. The reason, at least in this embodiment, is that the transmitting unit will transmit message packet 4, and while monitoring the diagnostic channel for the packet for loopback return, the transmitting device also transmits pattern message 5. However, by receiving the loopback sequence 5 before receiving sequence 4, the transmitting device detects the sequence error, and therefore identifies a fault in the permanent virtual circuit. In an alternative embodiment (not shown) the transmitting device may be configured such that it must receive loopback transmissions before transmitting the next sequence package in the pattern test. If a loopback package is not received within a predetermined period of time (i.e., time out), then the transmitting device would signal a sequence error. In such an embodiment, the transmitting device would have detected the dropped package associated with pattern message sequence 4, before transmitting packet sequence number 5.

In addition to the errors depicted in FIGS. 6A and 6B, errors could also be diagnosed if the pattern received by the receiving device (FIG. 6A embodiment) did not correlate with the expected pattern. Likewise, errors could be diagnosed if the pattern received back by the transmitting device (FIG. 6B embodiment) did correlated with the originally transmitted pattern.

As a final example, reference is made to FIG. 6C, which illustrates the transmissions associated with a connectivity test. When a connectivity function is active on a virtual circuit, a connectivity request frame is transmitted on the diagnostic channel, and a connectivity response frame is awaited. The receiving device, upon receipt of a connectivity request frame, responds with a connectivity response frame. A given connectivity test is said to be successful if a valid connectivity response package is received within a predetermined period of time. When a connectivity response package is received, the test is declared successful. The test is deemed to be unsuccessful if a predetermined period of time passes without receipt of a connectivity response. A successful transmission of this single packet test is illustrated in FIG. 6C. As the name indicates, a connectivity test merely tests the integrity/continuity of the virtual circuit. The pattern test, which extend over a relatively large number of frame packets, provides a better measure of other parameters, such as lost packets, due to congestion or other intermittent errors that may occur in the virtual circuit.

Figure 7:
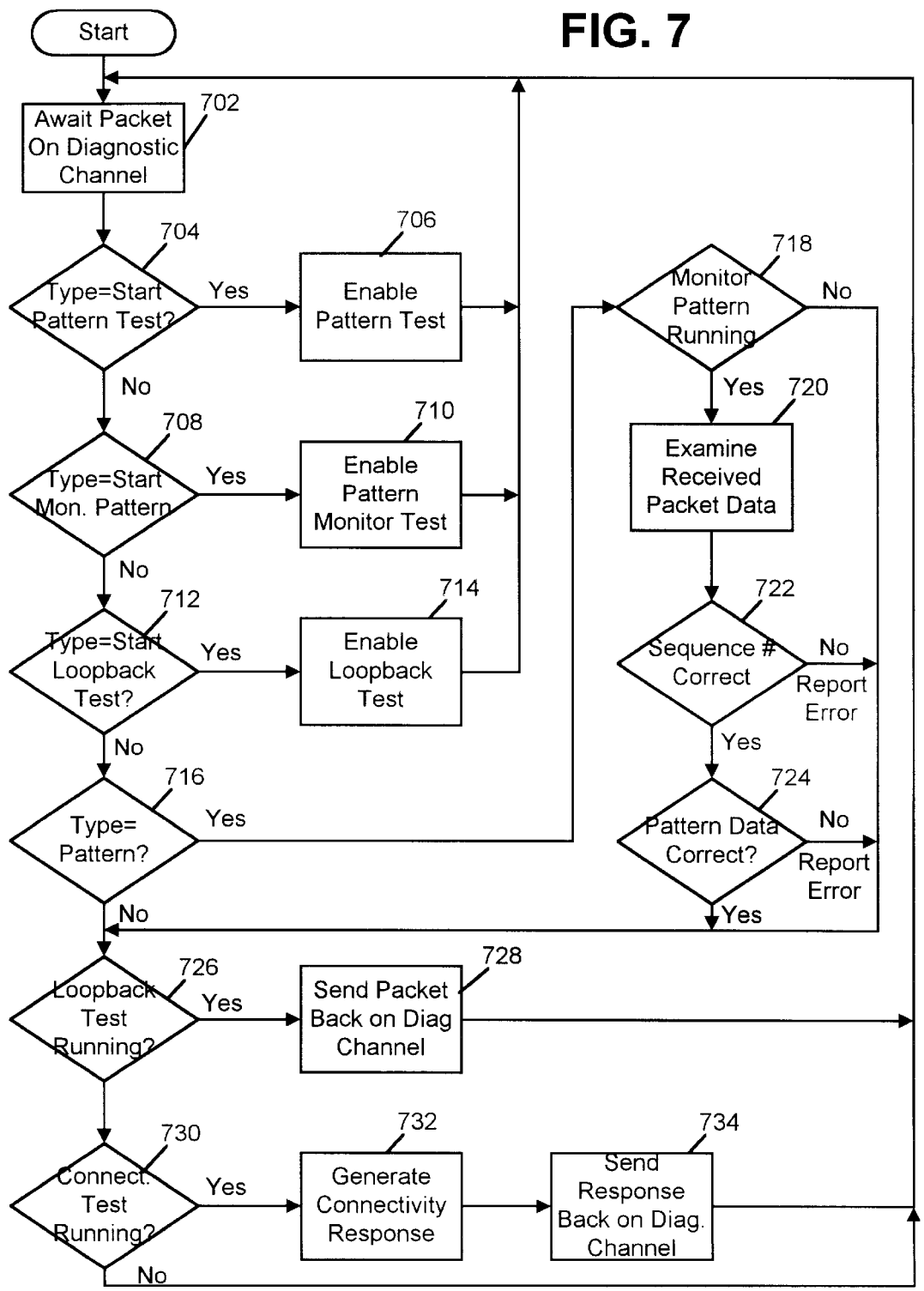
FIG. 7 is a top-level software flowchart illustrating a receiver process for diagnostics in accordance with the preferred embodiment of the present invention.
Figure 8:
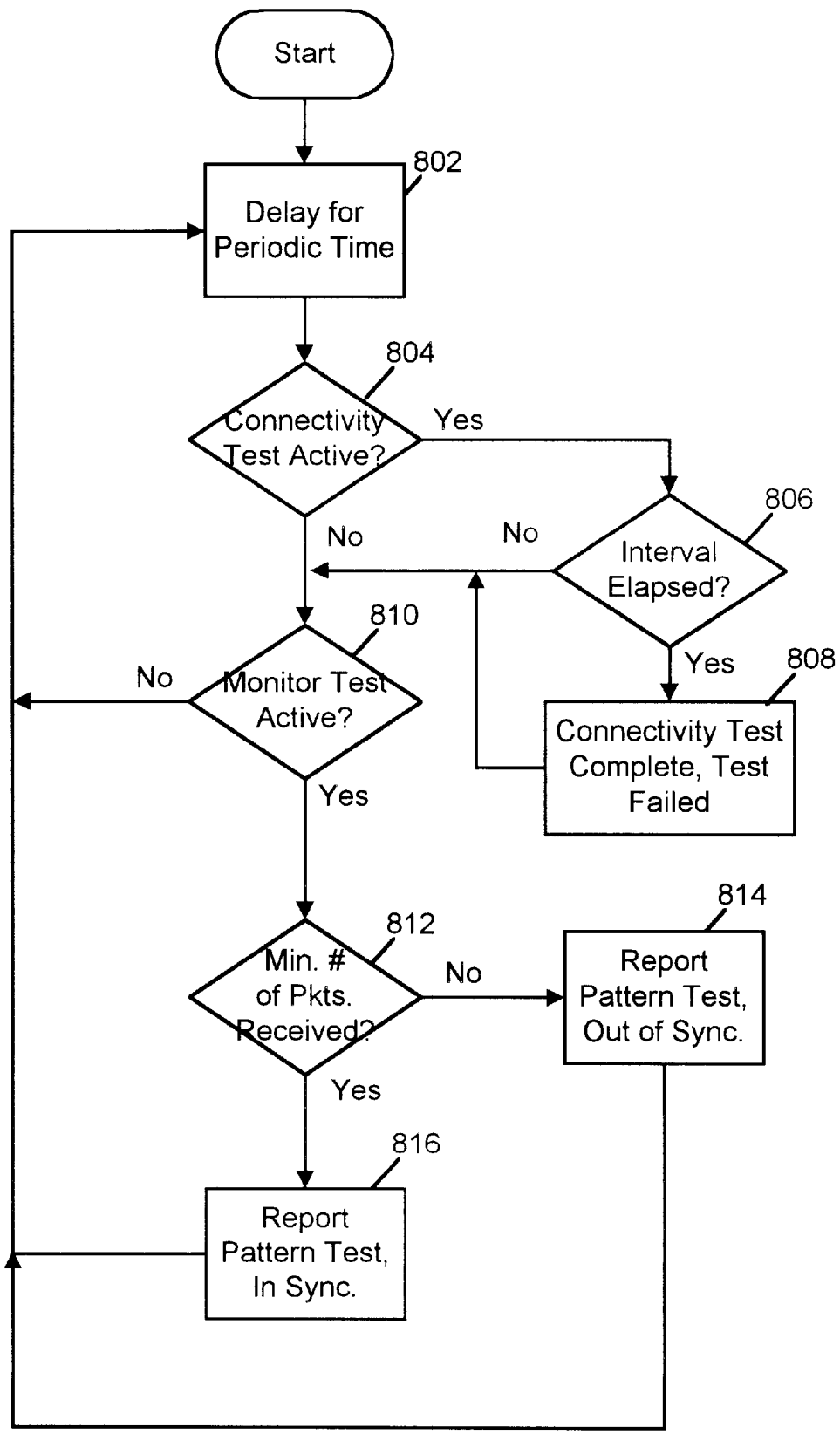
FIG. 8 is a top-level software flowchart illustrating a receiver-side periodic monitor process in accordance with the preferred embodiment of the present invention.
Figure 9:
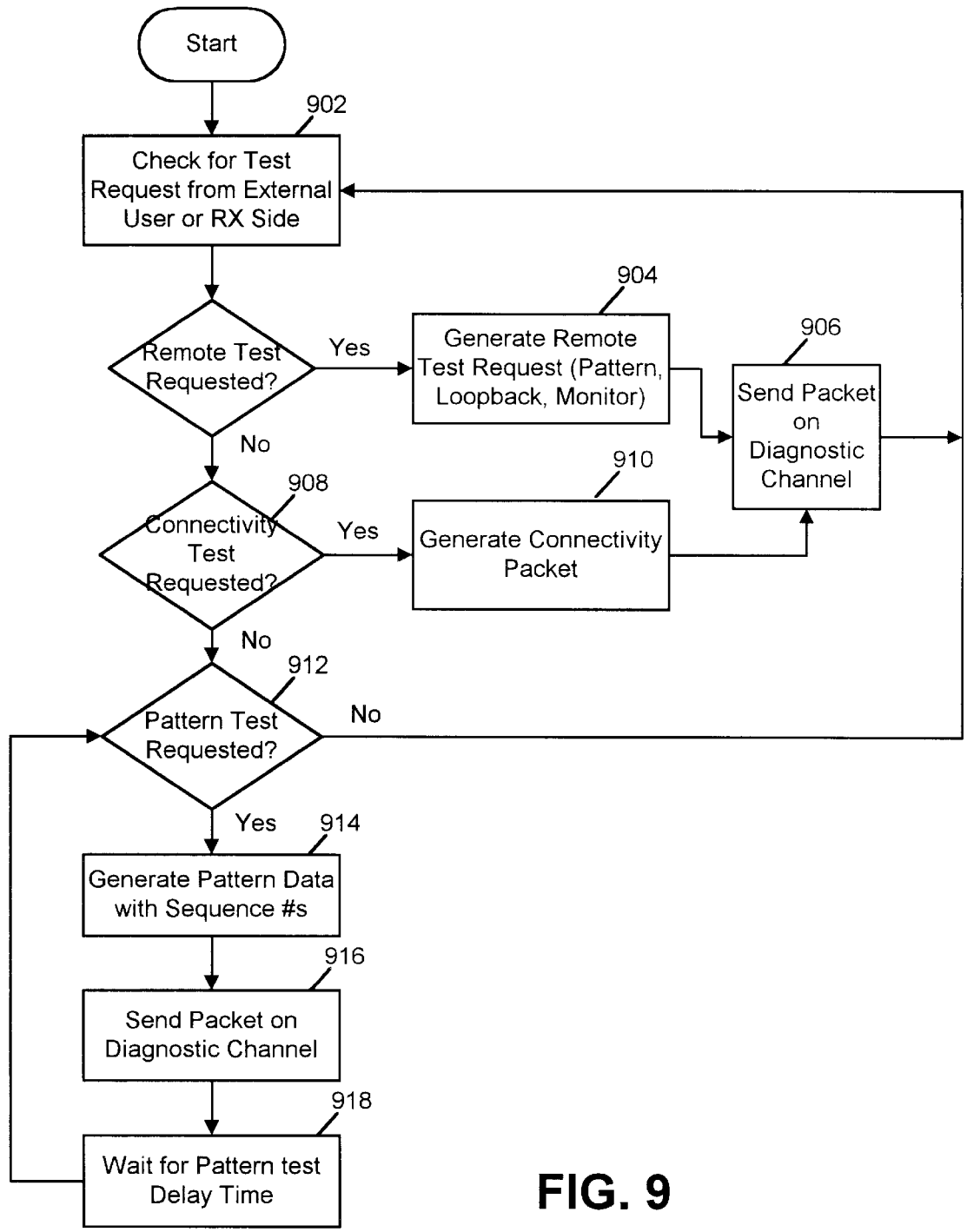
FIG. 9 is a top-level software flowchart illustrating a transmitter-side operation in accordance with the diagnostic process of the preferred embodiment of the present invention.

Having illustrated the concepts of the present invention by way of examples, reference is now made to FIGS. 7, 8, and 9 which are software flowcharts depicting the top-level operation of the preferred embodiment of the present invention. As an initial note, the use of the term transmission device or receiving device herein reflects only a particular mode of operation. It will be appreciated that the same physical device implements both the transmission and receiving functions. Reference is made to devices as transmitting devices and receiving devices merely for purposes of illustration, to discuss particular operational features of the physical devices.

Having said this, reference is made to FIG. 7 which illustrates the top-level operation of a receiving device, constructed in accordance with the preferred embodiment of the present invention. At step 702, the device awaits the receipt of a packet of information on the diagnostic channel. Of course, this packet of information could be a packet in a test sequence, it could be a test instruction or command, or any other message packet in accordance with the invention. Upon receiving the packet on the diagnostic channel, the receiving device evaluates the packet to determine if it is a start pattern test command (step 704). If so, the receiver enables the pattern test routine (step 706). Otherwise, the system proceeds to step 708, where it determines if the received packet is a command to start monitor pattern testing. If so, the receiver enables its pattern monitor test (step 710).

If the test of step 708 resolves to NO, the receiver determines whether the received packet is a command to start loopback testing (step 712). If so, it enables its loopback testing (step 714). Otherwise, it looks to the message type element of the packet to determine whether it is a pattern test (step 716). If so, it determines whether a monitor pattern test is running (step 718). If so, it examines the received data packet to determine both whether the packet contains the correct sequence number and if so, whether the pattern data contained within the packet is correct (steps 720, 722, and 724). If either the sequence number is incorrect or the pattern data itself is inaccurate, the system reports an error.

At step 726, the receiver evaluates whether a loopback test is running. If so, it transmits the packet back to the transmitting device on the diagnostic channel (step 728). If step 726 resolves to NO, the receiver evaluates whether a connectivity test is running (step 730). If a connectivity test is running, the receiver generates the appropriate connectivity response and sends a response back to the transmitting device on the diagnostic channel (steps 732 and 734).

Referring to FIG. 8, an alternative embodiment of the receiving device is illustrated. The embodiment illustrated in FIG. 8 is for periodic monitoring of the receiver side diagnostics. In this regard, a predetermined delay (step 802) is designed into the receiver. Thereafter, the receiver (at step 804) determines whether a connectivity test is active. If so, it determines whether a predetermined interval of time has elapsed (step 806), and if so, it indicates the connectivity test has failed (step 808). At step 810, it determines whether the monitor test is active, and if so, whether a minimum number of packets have been received (step 812). If not, it reports the pattern test is out of synchronization (step 814) and returns to step 802. If, however, the monitor test is active, and a minimum number of packets has been received correctly, the receiver reports that the pattern test is in synchronization (step 816).

Referring to FIG. 9, a flowchart illustrates the top-level operation of a transmitter constructed in accordance with the invention. Illustrated as an initial step, the transmitter tests for commands received from other devices requesting the initiation of diagnostic sequences (step 902). More specifically, the transmitting device may initiate its own diagnostic sequences, or it may initiate diagnostic sequences pursuant to instructions from a remote device. If a remote test is requested, then the system, at step 904, will generate the remote test in accordance with the instruction received, and will transmit an appropriate packet or packets of data along the diagnostic channel (step 906). Otherwise, the transmitter will look to determine whether a connectivity test is requested (step 908). If so, it will generate a connectivity test packet (step 910) and send that packet on the diagnostic channel to the remote receiving device.

If step 908 resolves to NO, the transmitter will look to determine whether a pattern test is requested (step 912). If not, it returns to step 902. If so, however, it generates pattern data, divides that data into data packets, and assigns each packet a particular sequence number (step 914). It then sends these packets one by one to a remote receiving device, on the diagnostic channel (step 916). At step 918, the transmitter waits for a predetermined period of time before continuing to send packets.

Again, the flow charts of FIGS. 7, 8, and 9 are provided to merely illustrate the preferred embodiment of the present invention. The particular tests and manner of carrying out the diagnostic routines can be implemented in a wide variety of ways, consistent with the concepts and teaching of the present invention, which is merely to provide non-disruptive diagnostics over a virtual circuit by reserving or dedicating (by address) a unique channel for diagnostic communications. All diagnostic communications between a transmitting device and a receiving device are carried out over this uniquely defined channel.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for providing non-disruptive diagnostics between a first device and a second device in communication through a virtual circuit of a frame relay network, the virtual circuit comprising a plurality of logical circuits, the method comprising the steps of:

defining one of the plurality of logical circuits as a diagnostic channel by assigning it a unique channel address;

defining one or more test sequence;

selecting one or more of the test sequence by the first device and transmitting it to the second device across the diagnostic channel;

receiving and identifying the one or more test sequence transmitted by the first device;

executing appropriate steps in response to the one or more test sequence received from the first device;

identifying if the executed steps reflect a fault in the virtual circuit.

2. The method as defined in claim 1, wherein the test sequence includes one or more from the group consisting of: a pattern message, a connectivity request, a start send pattern command, a start loopback command, a start monitor pattern command, and a start send pattern command.

3. The method as defined in claim 1, wherein the test sequence is a pattern test command.

4. The method as defined in claim 1, wherein the test sequence is a connectivity test command.

5. The method as defined in claim 1, wherein the diagnostic channel is identified by an address value.

6. The method as defined in claim 1, wherein the virtual circuit comprises a plurality of logical circuits, each of the logical circuits being multiplexed over a single virtual circuit.

7. A method for providing non-disruptive diagnostics between a first device and a second device in communication through a virtual circuit of a frame relay network, the method comprising the steps of:
defining a diagnostic channel by assigning it a unique channel address;
transmitting a test command from the first device to the second device across the unique channel address;
monitoring the unique channel address for a response to the test command; and
evaluating the response to determine whether it reflects a fault in the virtual circuit.

8. The method as defined in claim 7, wherein the test command includes one or more from the group consisting of: a pattern message, a connectivity request, a start send pattern command, a start loopback command, a start monitor pattern command, and a start send pattern command.

9. The method as defined in claim 7, wherein the test command is a pattern message command.

10. The method as defined in claim 7, wherein the test command is a connectivity test command.

11. The method as defined in claim 7, wherein the test command is a pattern test and a loopback diagnostic test sequence is presently underway.

12. The method as defined in claim 7, wherein the diagnostic channel is identified by an address value.

13. The method as defined in claim 7, wherein the virtual circuit comprises a plurality of logical circuits, each of the logical circuits being multiplexed over a single virtual circuit.

14. The method as defined in claim 9, wherein the evaluating step includes totaling a total number of errors received for a predetermined number of sequence packets transmitted to determine whether a error level is acceptable.

15. The method as defined in claim 10, wherein the monitoring step includes monitoring the diagnostic channel for only a predetermined period of time.

16. The method as defined in claim 15, wherein the evaluating step includes identifying an error condition if the predetermined period of time has expired an no acknowledgment signal has been received.

17. The method as defined in claim 10, wherein the evaluating step includes identifying a single acknowledgment, indicating that the virtual circuit is in satisfactory condition.

18. The method as defined in claim 11, wherein the evaluating step includes identifying a successful diagnostic test if a returned test pattern is identical to a test pattern transmitted in the transmitting step.

19. The method as defined in claim 11, wherein the transmitting, monitoring, and evaluating steps are repeatedly executed for a large number of data packets.

20. A system for providing non-disruptive diagnostics between a first device and a second device in communication through a virtual circuit of a frame relay network, the virtual circuit comprising a plurality of logical circuits, the system comprising:
defining means for defining one of the plurality of logical circuits as a diagnostic channel by assigning it a unique channel address;
testing means for initiating a test sequence by the first device, the testing means including transmitting means for transmitting the test sequence to the second device across the diagnostic channel;
receiving means associated with the second device for receiving and identifying the test sequence transmitted by the first device;
responding means associated with the second device for responding to the test sequence, the responding means being configured to transmit its response over the diagnostic channel;
evaluating means associated with the first device for identifying the response.

21. The system as defined in claim 20, wherein the test sequence is one or more selected from the group consisting of: a pattern message, a connectivity request, a start send pattern command, a start loopback command, a start monitor pattern command, and a start send pattern command.

22. The system as defined in claim 20, wherein the first device includes multiplexing means for multiplexing communications from a plurality of first communicating devices associated with the first device into the virtual circuit, the communications being directed to a plurality of second communicating devices associated with the second device.

23. The system as defined in claim 22, wherein the multiplexing means includes means for defining a plurality of logical connections.

24. The system as defined in claim 22, wherein the multiplexing means is configured to multiplex the communications from the plurality of first communicating devices by assigning each a unique channel for the virtual circuit, each channel being accessed by a unique address.

25. The system as defined in claim 20, wherein the test sequence includes a pattern test.

26. The system as defined in claim 20, wherein the test sequence includes a connectivity test.

27. A computer readable storage medium containing program code for controlling a method for providing non-disruptive diagnostics between a first device and a second device in communication through a virtual circuit of a frame relay network, the method comprising the steps of:
defining a diagnostic channel by assigning it a unique channel address;
transmitting a test command from the first device to the second device across the unique channel address;
monitoring the unique channel address for a response to the test command; and
evaluating the response to determine whether it reflects a fault in the virtual circuit.

28. A system for providing non-disruptive diagnostics between a first device and a second device in communication through a virtual circuit of a frame relay network, the virtual circuit comprising a plurality of logical circuits, the system comprising:
a defining unit configured to define one of the plurality of logical circuits as a diagnostic channel by assigning it a unique channel address;

a testing unit configured to initiate a test sequence by the first device, the testing means including a transmitter that transmits the test sequence to the second device across the diagnostic channel;

a receiver associated with the second device and configured to receive and identifying the test sequence transmitted by the first device;

a responding unit associated with the second device and configured to respond to the test sequence, the responding unit being further configured to transmit its response over the diagnostic channel; and and evaluating unit associated with the first device, the evaluating unit configured to identify the response.

29. In a system having a first plurality of communicating devices communicating with a second plurality of communicating devices through a virtual circuit of a frame relay network, wherein the first plurality of communicating devices communicates across the virtual circuit through a first frame relay access unit and the second plurality of communicating devices communicates across the virtual circuit through a second frame relay access unit, a method for providing non-disruptive diagnostics comprising the steps of:

defining a plurality of logical connections, each logical connection representing a communication path between one of the first communicating devices and one of the second communicating devices;

multiplexing each of the logical connections onto the virtual circuit by assigning each logical connection a unique communication channel, each communication channel representing a statistical time slot;

dedicating a unique communication channel for diagnostic messaging;

generating a test message for transmission from the first frame relay access unit to the second frame relay access unit;

receiving the test message at the second frame relay access unit; and responding to the test message.

30. In a system having a first plurality of communicating devices communicating with a second plurality of communicating devices through a virtual circuit of a frame relay network, wherein the first plurality of communicating devices communicates across the virtual circuit through a first frame relay access unit and the second plurality of communicating devices communicates across the virtual circuit through a second frame relay access unit, wherein the first and second frame relay access units are configured to multiplex the plurality of communications by assigning each distinct communication path a statistical time slot represented by a channel in the virtual circuit, a method for providing non-disruptive diagnostics comprising the steps of:

dedicating a unique communication channel for diagnostic messaging;

generating a test message for transmission from the first frame relay access unit to the second frame relay access unit;

receiving the test message at the second frame relay access unit; and responding to the test message.

* * * * *

UNITED STATES PATENT AND TRADEMARK OFFICE
Certificate

Patent No. 5,898,674                                                 Patented: April 27, 1999

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Ted N. Mawhinney, Clearwater, FL; and Richard A. Mundwiler, Safety Harbor, FL.

Signed and Sealed this Thirteenth Day of April 2004.

<div align="right">WELLINGTON CHIN<br>
*Supervisory Patent Examiner*<br>
Art Unit 2664</div>

UNITED STATES PATENT AND TRADEMARK OFFICE
Certificate

Patent No. 5,898,674                                                              Patented: April 27, 1999

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Ted N. Mawhinney, Clearwater, FL; Richard A. Mundwiler, Safety Harbor, FL; and Katherine Wilson, Clearwater, FL.

Signed and Sealed this Fourth Day of January 2005.

WELLINGTON CHIN
                                                                                                                                  *Supervisory Patent Examiner*
                                                                                                                                              Art Unit 2664